United States Patent
Kulkarni et al.

(10) Patent No.: US 10,449,815 B2
(45) Date of Patent: Oct. 22, 2019

(54) CURRENT SENSING ELECTRICAL CONVERTER

(71) Applicant: Cequent Performance Products, Inc., Plymouth, MI (US)

(72) Inventors: Chandrakumar D. Kulkarni, Battle Creek, MI (US); Douglas R. Motts, Fort Wayne, IN (US)

(73) Assignee: HORIZON GLOBAL AMERICAS INC., Plymouth, MI (US)

( * ) Notice: Subject to any disclaimer, the term of this patent is extended or adjusted under 35 U.S.C. 154(b) by 0 days.

(21) Appl. No.: 13/650,906

(22) Filed: Oct. 12, 2012

(65) Prior Publication Data

US 2014/0001730 A1    Jan. 2, 2014

Related U.S. Application Data

(60) Provisional application No. 61/546,511, filed on Oct. 12, 2011.

(51) Int. Cl.
  *G08B 21/00* (2006.01)
  *B60D 1/64* (2006.01)

(52) U.S. Cl.
  CPC ..................................... *B60D 1/64* (2013.01)

(58) Field of Classification Search
  CPC ...... B60Q 1/305; B60Q 1/0088; B60Q 11/00; B62D 53/125; B62D 53/12; B60D 1/58; B60D 1/62; B60D 1/64; B60T 2230/06; B60T 8/323
  See application file for complete search history.

(56) References Cited

U.S. PATENT DOCUMENTS

| | | | | |
|---|---|---|---|---|
| 3,199,026 A | * | 8/1965 | Leibowitz | G01R 1/22 324/117 H |
| 3,909,075 A | * | 9/1975 | Pittet, Jr. | B60T 8/323 188/181 A |
| 4,064,413 A | * | 12/1977 | Andersen | 315/77 |
| 4,115,764 A | * | 9/1978 | Yamaguchi et al. | 340/530 |

(Continued)

FOREIGN PATENT DOCUMENTS

| EP | 2224253 A1 * | 9/2010 | B60Q 1/305 |
|---|---|---|---|
| WO | WO03066376 | 8/2003 | |

OTHER PUBLICATIONS

Chen Yang, Technologies GmbH & Co. KG Split Core Sensor, Mar. 1, 2011.*

(Continued)

*Primary Examiner* — Quang Pham
(74) *Attorney, Agent, or Firm* — McDonald Hopkins LLC

(57) ABSTRACT

An electrical converter assembly includes a sensing device coupled to one or more wires of a towing vehicle. The sensing device is configured to detect the current flow in the one or more wires and generate a signal in response to the current flow. The converter assembly further includes an electrical component in communication with the sensing device. The electrical component may generate a signal to a towed vehicle in response to the current flow detected by the sensing device. The sensing device may be a non-invasive sensing device. The non-invasive sensing device may detect current flow in the one or more wires of the towing vehicle without direct contact with the conducting element of the wires.

24 Claims, 15 Drawing Sheets

(56) References Cited

U.S. PATENT DOCUMENTS

| | | | | |
|---|---|---|---|---|
| 4,295,687 A * | 10/1981 | Becker | B60T 13/741 | 188/3 R |
| 4,317,079 A * | 2/1982 | Yamamura | G01V 3/38 | 324/326 |
| 4,542,334 A * | 9/1985 | Nelson | G01B 7/31 | 324/326 |
| 4,751,431 A * | 6/1988 | Ducote | | 315/77 |
| 4,846,697 A * | 7/1989 | Rodgers | | 439/35 |
| 4,972,140 A * | 11/1990 | Okazaki | G01R 15/202 | 324/117 H |
| 5,184,960 A * | 2/1993 | Hopkins et al. | | 439/35 |
| 5,315,293 A * | 5/1994 | Kamiya | H02H 3/0935 | 340/635 |
| 5,333,948 A * | 8/1994 | Austin | B60T 7/20 | 303/24.1 |
| 5,498,910 A * | 3/1996 | Hopkins | B60Q 1/305 | 307/10.1 |
| 5,521,466 A * | 5/1996 | Vincent | | 315/77 |
| 5,693,985 A * | 12/1997 | Gee et al. | | 307/9.1 |
| 5,729,058 A * | 3/1998 | Groeller | | 307/10.8 |
| 5,739,592 A * | 4/1998 | Rigsby | B60D 1/62 | 280/422 |
| 5,760,545 A * | 6/1998 | Mikel | | 315/77 |
| 6,039,410 A * | 3/2000 | Robertson | B60T 7/20 | 188/3 R |
| 6,040,555 A * | 3/2000 | Tiller | B23K 9/1087 | 219/132 |
| 6,087,777 A * | 7/2000 | Long | | 315/82 |
| 6,130,599 A * | 10/2000 | Juds | H01L 43/06 | 257/E43.002 |
| 6,177,865 B1 * | 1/2001 | Bryant | B60D 1/62 | 307/10.8 |
| 6,259,170 B1 * | 7/2001 | Limoge | B60Q 1/305 | 307/10.1 |
| 6,271,656 B1 * | 8/2001 | Juds | G01R 15/20 | 324/117 H |
| 6,325,466 B1 * | 12/2001 | Robertson | B60T 13/74 | 303/124 |
| 6,515,468 B1 * | 2/2003 | Morimoto | G01R 15/207 | 324/117 H |
| 6,545,600 B1 * | 4/2003 | Boner | B60Q 1/305 | 307/10.1 |
| 6,566,855 B1 * | 5/2003 | Nguyen | G01R 19/252 | 324/117 H |
| 6,642,704 B2 * | 11/2003 | Hastings | G01R 1/02 | 324/117 H |
| 6,642,705 B2 * | 11/2003 | Kawase | G01R 15/20 | 324/117 H |
| 6,731,105 B1 * | 5/2004 | Hoyle | G01R 15/207 | 324/117 R |
| 6,909,363 B2 * | 6/2005 | Bell et al. | | 340/431 |
| 7,106,182 B2 * | 9/2006 | De Wilde | | 340/431 |
| 7,145,322 B2 * | 12/2006 | Solveson | G01R 15/183 | 324/127 |
| 7,145,442 B1 * | 12/2006 | Wai | | 340/438 |
| 7,253,602 B2 * | 8/2007 | Shvach | G01D 21/00 | 324/117 H |
| 7,339,465 B1 * | 3/2008 | Cheng | B60Q 1/305 | 307/10.8 |
| 7,355,347 B1 * | 4/2008 | Bell et al. | | 315/80 |
| 7,511,609 B2 * | 3/2009 | Hammerschmidt | B60C 23/0408 | 340/442 |
| 7,679,357 B2 * | 3/2010 | Aratani | G01R 15/202 | 324/117 H |
| 8,129,909 B1 * | 3/2012 | Hoekstra | B60Q 1/305 | 307/10.1 |
| 8,258,703 B1 * | 9/2012 | Hoekstra | B60Q 1/305 | 315/77 |
| 8,831,787 B2 * | 9/2014 | Brickell | B66C 13/16 | 212/272 |
| 8,836,318 B2 * | 9/2014 | Cheng | G01R 15/20 | 324/117 H |
| 9,413,118 B2 * | 8/2016 | Suzuki | H01R 13/6683 | |
| 2002/0047684 A1 * | 4/2002 | Robertson | B60T 8/1708 | 318/762 |
| 2003/0038534 A1 * | 2/2003 | Barnett | B60T 8/1708 | 303/7 |
| 2004/0090114 A1 * | 5/2004 | Macnamara | B60T 8/1708 | 303/118.1 |
| 2005/0057348 A1 * | 3/2005 | Hammerschmidt | B60C 23/0408 | 340/445 |
| 2005/0104747 A1 * | 5/2005 | Silic | G08G 1/005 | 340/944 |
| 2005/0127747 A1 * | 6/2005 | Robertson | B60T 7/20 | 303/20 |
| 2005/0134254 A1 * | 6/2005 | Roden | G01R 1/203 | 324/126 |
| 2006/0076838 A1 * | 4/2006 | Solveson | G01R 15/183 | 307/651 |
| 2006/0076946 A1 * | 4/2006 | Shvach | G01D 21/00 | 324/126 |
| 2006/0082356 A1 * | 4/2006 | Zhang | G01R 15/181 | 342/117 R |
| 2006/0085099 A1 * | 4/2006 | Burlak | B60D 1/62 | 701/1 |
| 2006/0091817 A1 * | 5/2006 | Herrig | B60Q 1/34 | 315/200 A |
| 2006/0146553 A1 * | 7/2006 | Zeng | B60Q 11/002 | 362/488 |
| 2006/0173584 A1 * | 8/2006 | Einig | B60T 8/1708 | 701/1 |
| 2006/0187078 A1 * | 8/2006 | Bell et al. | | 340/815.4 |
| 2006/0214506 A1 * | 9/2006 | Albright et al. | | 303/123 |
| 2007/0013499 A1 * | 1/2007 | Hammerschmidt | B60C 23/0408 | 340/442 |
| 2007/0241869 A1 * | 10/2007 | Kalous | B60Q 1/305 | 340/431 |
| 2007/0273359 A1 * | 11/2007 | Grupa | G01R 15/202 | 324/117 H |
| 2008/0007416 A1 * | 1/2008 | Cern | G01R 15/14 | 340/664 |
| 2008/0143179 A1 * | 6/2008 | Rutherford | B60T 7/20 | 303/160 |
| 2009/0128131 A1 * | 5/2009 | Kobayashi | | 324/120 |
| 2009/0302858 A1 * | 12/2009 | Kulkarni et al. | | 324/504 |
| 2010/0029097 A1 * | 2/2010 | Burlak et al. | | 439/35 |
| 2010/0222979 A1 * | 9/2010 | Culbert | B60T 7/20 | 701/70 |
| 2010/0308559 A1 * | 12/2010 | Tarasinski et al. | | 280/422 |
| 2012/0039062 A1 * | 2/2012 | McBee | H01F 27/06 | 361/825 |
| 2013/0158826 A1 * | 6/2013 | Cusi | B60T 8/1708 | 701/70 |
| 2014/0333282 A1 * | 11/2014 | Javora | G01R 15/142 | 324/76.11 |
| 2015/0015418 A1 * | 1/2015 | Stanek | G08G 1/09626 | 340/901 |
| 2015/0028163 A1 * | 1/2015 | Hochman | B61L 5/1881 | 246/194 |

OTHER PUBLICATIONS

International Search Report and the Written Opinion of the International Searching Authority, Cequent Performance Products, Inc., Jan. 11, 2013.

European Patent Office, Annex to European Search Report, EP12839659, dated Mar. 23, 2015.

* cited by examiner

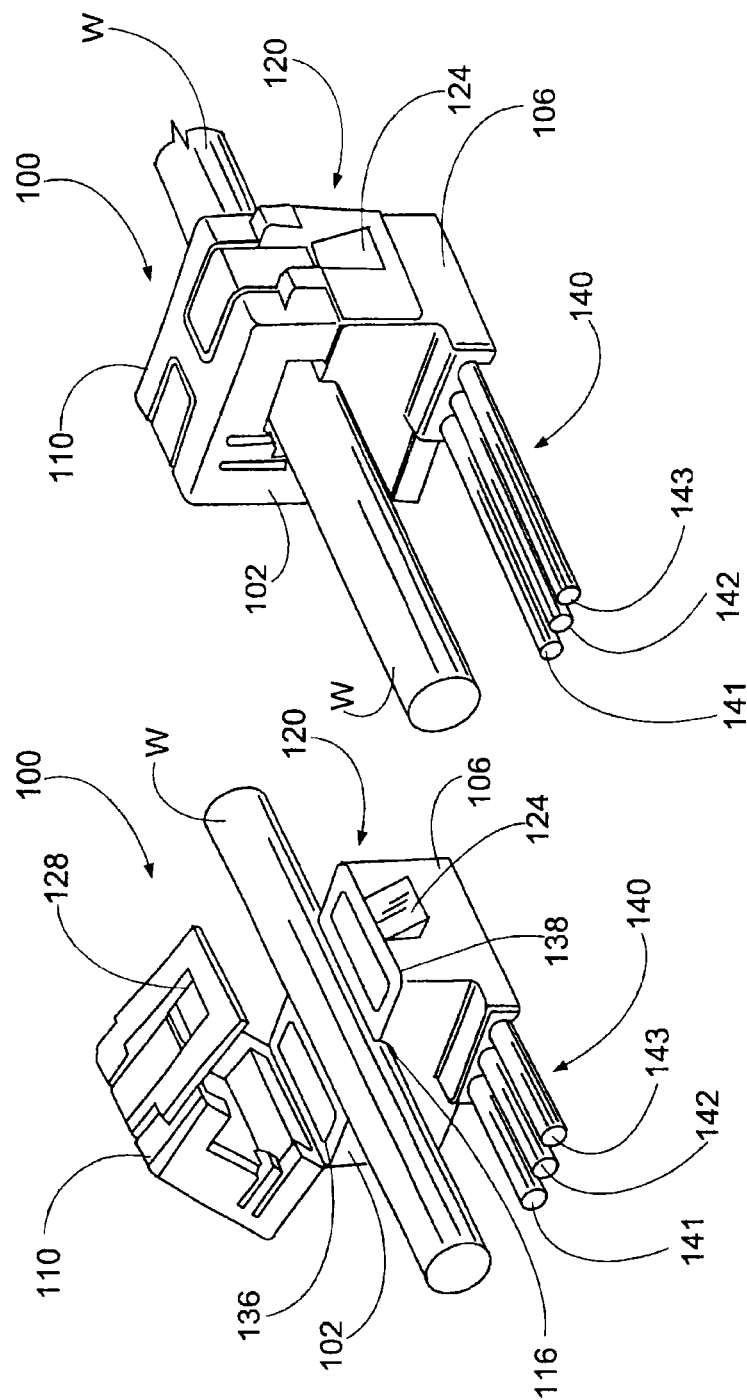

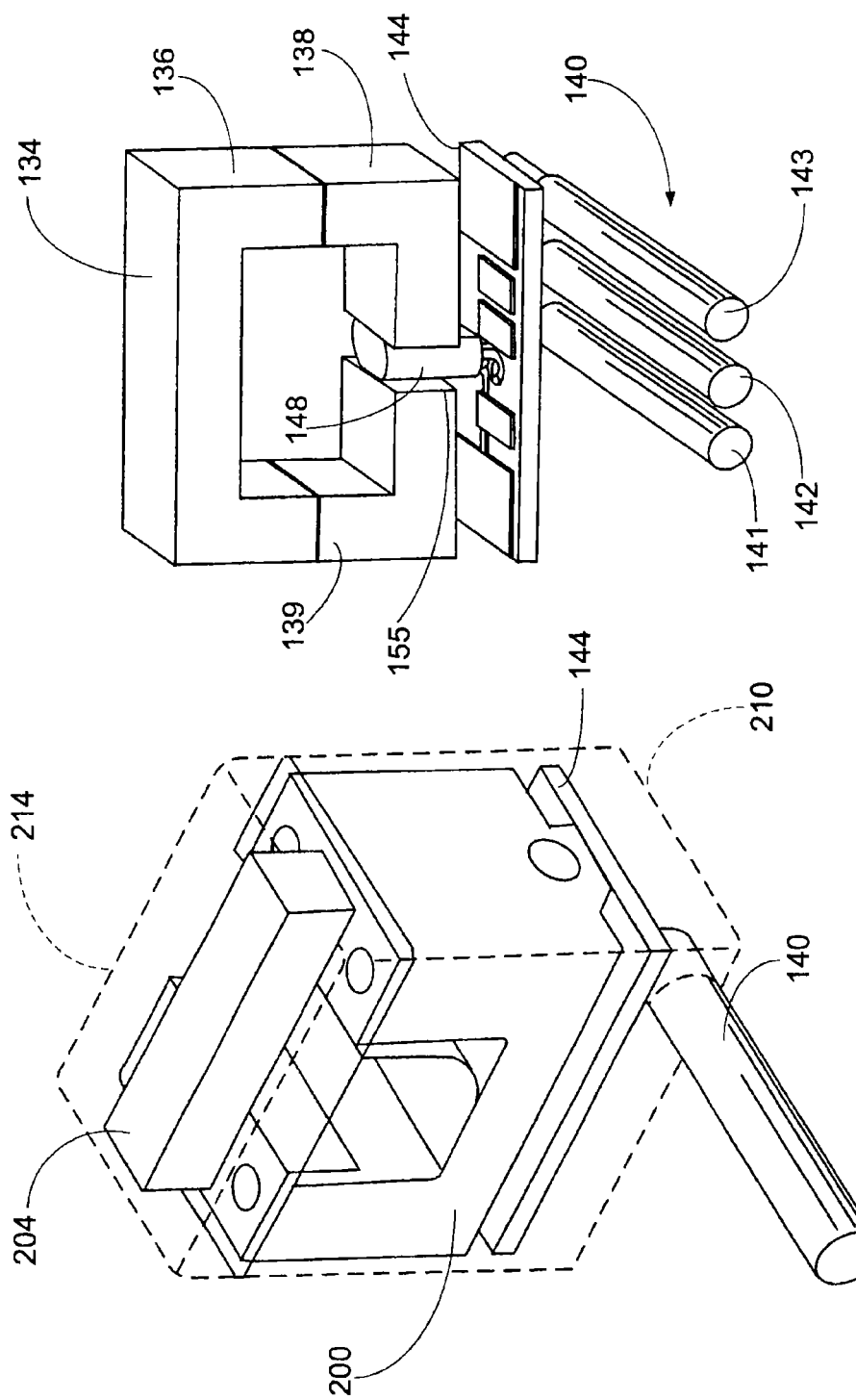

CURRENT SENSING ELECTRICAL CONVERTER

CROSS REFERENCE TO RELATED APPLICATIONS

This application claims the benefit of U.S. Provisional Patent Application No. 61/546,511, filed Oct. 12, 2011 and entitled "CURRENT SENSING ELECTRICAL CONVERTER," which is incorporated by reference in its entirety.

FIELD OF INVENTION

The present invention relates generally to an electrical converter and, more particularly, to a current sensing electrical converter.

BACKGROUND

When a towing vehicle tows a towed vehicle, such as a trailer, lighted signals are often maintained on the towed vehicle, which indicate the movement status of the towing vehicle and towed vehicle. For example, left and right turn signal lights indicate a present or impending movement of the vehicles in the indicated direction. As another example, brake lights indicate application of the towing vehicle's brakes by the operator. It is, therefore, useful that the towed vehicle light indicators generally match those of the towing vehicle.

A converter or circuitry may be used to detect an active input signal on the left, right, stoplight and tail channels of the towing vehicle and send a signal to a towed vehicle to operate a corresponding light on the towed vehicle. Converters typically utilize voltage measurements, such as hard-wired connections, to detect the presence of the applicable input signal.

The installation of a typical converter is often cumbersome and time consuming. The input connections are often made by either providing connectors on the vehicle harness and providing mating connectors on the converter or using insulation displacement connectors or self-striping electrical tap connectors, such as for example Scotchlok type connectors. Both of these approaches are hard-wired connections and can be time consuming and unique to the towing and/or towed vehicle. Still further, once the installation is complete, it is difficult to remove and port the converter to a different towing or towed vehicle, especially one of a different make or model.

The converters are connected directly to the electrical system of the towing vehicle. Such as for example, through splicing the wires to detect the voltage in the wires. This direct electrical connection imparts electrical load on the towing vehicle's electronics. This load may result in triggering a diagnostic code in the electronic system, which may result in setting off an alarm on the towing vehicle. Doing this may necessitate taking the towing vehicle to the dealer for troubleshooting. Still further, these connections may void the warranty of the towing vehicle and/or damage the electronics in the towing vehicle.

Alternatively, the electrical connections between the towing and towed vehicles often utilize a custom approach. In these systems, the towing vehicle manufacturer provides the harness with connectors to plug into and the converter provides the mating connectors in its harness thereby making a hard-wired connection between the converter and the electrical system of the towing vehicle. Since the harness and connections can vary with each make/model, a custom harness with mating connectors must be configured for each applicable make and model of vehicle.

There is a need, therefore, for a converter that is portable and can be used with any vehicle regardless of the make or model of the vehicle. There is a need for a converter that does not directly connect to the towing vehicle's electrical system.

SUMMARY

An electrical converter assembly is generally presented. The converter assembly includes a sensing device coupled to one or more wires of a towing vehicle. The sensing device is configured to detect the current flow in the one or more wires and generate a signal in response to the current flow. The converter assembly further includes an electrical component in communication with the sensing device. The electrical component may generate a signal to a towed vehicle in response to the current flow detected by the sensing device.

In an embodiment, the sensing device may be a non-invasive sensing device. The non-invasive sensing device may detect current flow in the one or more wires of the towing vehicle without direct contact with the conducting element of the wires.

DESCRIPTION OF THE DRAWINGS

Operation of the invention may be better understood by reference to the following detailed description taken in connection with the following illustrations, wherein:

FIG. 2 is a perspective view of an embodiment of a sensor assembly for an electrical converter in an open position.

FIG. 3 is a perspective view of an embodiment of the sensor assembly for an electrical converter in a closed position.

FIG. 4 is a perspective view of a portion of a sensor assembly for an electrical converter with a housing in phantom.

FIG. 5 is a perspective view of a portion of a sensor assembly for an electrical converter.

DETAILED DESCRIPTION

Reference will now be made in detail to exemplary embodiments of the present invention, examples of which are illustrated in the accompanying drawings. It is to be understood that other embodiments may be utilized and structural and functional changes may be made without departing from the scope of the invention. Moreover, features of the various embodiments may be combined or altered without departing from the scope of the invention. As such, the following description is presented by way of illustration only and should not limit in any way the various alternatives and modifications that may be made to the illustrated embodiments and still be within the spirit and scope of the invention.

Figure 1:
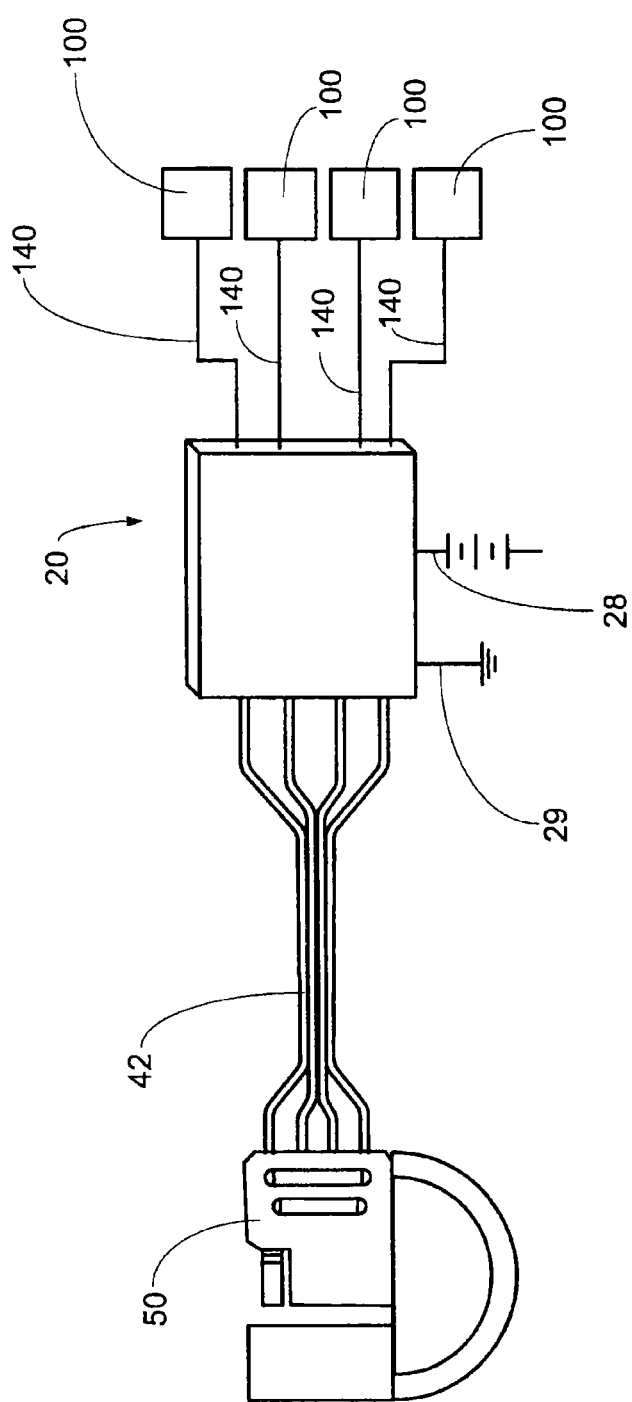
FIG. 1 is a top view of an embodiment of an electrical converter with a plurality of sensor assemblies.

An embodiment of an electrical converter 20 is shown in FIG. 1. The electrical converter 20 may be connected to an electrical system of a towing vehicle, whereby the electrical converter 20 may be operatively coupled with a lighting system of the towing vehicle. When it is desired to tow a towed vehicle, the subservient lighting system of the towed vehicle may be connected to the converter 20. Converter 20 can activate the appropriate lights or lamps on the towed vehicle in response to the operational characteristics of the towing vehicle based on sensing the operational characteristics, as described below. Connecting the lighting systems of the towing and towed vehicles through converter 20 may allow the lamps of the towed vehicle to operate consistently with the lamps of the towing vehicle. By way of a non-limiting example, if the left turn signal of the towing vehicle is initiated by an operator of the towing vehicle, the electrical converter 20 may sense the signal of the left turn signal and initiate a signal on the towed vehicle to operate its left turn signal. This may occur for at least one of the left and right turn signals, the brake lights, and the tail channels of the towing vehicle. Moreover, this may occur in any appropriate combination of the left and right turn signals, the brake lights, and the tail channels of the towing vehicle. Still further, this may occur for reverse or any other appropriate signals. The present teachings are not limited to the signals set forth herein and may apply to any appropriate signal on the towing vehicle and towed vehicle.

The electrical converter 20 may be of any appropriate configuration. Exemplary embodiments of an electrical converter 20 are shown and described herein. The present teachings may apply to any appropriate electrical converter and are not limited to those shown and described herein. By way of a non-limiting example, the electrical converter 20 may include a housing 25 that may have enclosed therein the relevant operative electrical components, which may consist of an appropriately configured circuit board assembly. The electrical components may be operatively connected with a power cord 28 and a ground wire 29. The power cord 28 may be operatively connected with a power source on the towing vehicle and the ground wire 29 may be operatively connected with a ground source of the towing vehicle, such as the vehicle frame.

The electrical converter 20 may further include a plurality of sensor assemblies 100 operatively coupled with the electrical components within housing 25. By way of a non-limiting example, each of the sensor assemblies 100 (described further below) may be operatively coupled to the electrical components of the electrical converter 20 through a plurality of wires 140 (described further below). Converter 20 may include a ground wire 36 and a power cord 38 that may be capable of connecting directly to the power source of the towing vehicle, such as by way of a non-limiting example, directly to the battery of the towing vehicle.

The electrical converter 20 may also include an output device 40 that may be operatively coupled to the electrical components in housing 25 and to the electrical system of the towed vehicle, such as the towed vehicle lighting system by way of non-limiting example. The output device 40 may include a plurality of wires 42 coupled to a connector 50 that is configured to connect with the lighting system of the towed vehicle. Any appropriate number of wires 42 may be used and connector 50 may be of any appropriate shape and size. The present teachings are not limited to a specific connector 50. By way of a non-limiting example, the connector 50 may include a 4-way, 5-way, 6-way, 7-way or any appropriate connector that may be capable of connecting with the towed vehicle electrical system; and more specifically to the lighting system of the towed vehicle. The output device 40 may be configured to interface with a communications bus of a towed vehicle. The communications bus may use any appropriate communications protocol, such as CAN, LIN, HSCAN, or any other protocol.

In operation, each sensor assembly 100 may detect electric current flow through an associated wire of the towing vehicle electrical system, the electric current flow being indicative of an operating characteristic of the towing vehicle. Electrical converter 20 may use the detected electric current flow to activate or trigger a response in the electrical system of the towed vehicle. By way of a non-limiting example, sensor assembly 100 may detect electric current flow that is indicative of the operation of the left, right, taillight, reverse, brake light, backup, auxiliary or the like of the towing vehicle, or any combination of such. The sensor assemblies 100 may detect any appropriate input or activation of a system of the towing vehicle. This detection may then be used by converter 20 to operate or activate a corresponding response in the electrical system of the towed vehicle, such as in the towed vehicle's lighting system.

Each sensor assembly 100 may sense and identify the activation of a predetermined signal on the towing vehicle. An exemplary embodiment of a sensor assembly 100 is shown in FIGS. 2 and 3. The construction of the sensor assembly 100, however, is not limited to that shown and described and may be of any appropriate construction. The sensor assembly 100 may be operatively coupled with the electrical converter 20, such as through wires 140 or any other appropriate manner, such that the sensor assembly 100 may send an appropriate signal to the electrical converter 20 upon an occurrence of a predetermined event. Such events may be, by way of a non-limiting example, a left turn signal being initiated on the towing vehicle, a right turn signal being initiated on the towing vehicle, a stoplight being initiated on the towing vehicle, a taillight being initiated on the towing vehicle, a backup signal being initiated on the towing vehicle, an auxiliary signal being initiated on the towing vehicle or a battery charger signal on a trailer battery channel. Still further, such events may be a combination of a turn signal (right or left) being initiated on the towing vehicle, a stoplight being initiated on the towing vehicle, and/or a taillight being initiated on the towing vehicle. Still further, such event may be a reverse light being initiated on the towing vehicle or any other appropriate signal from the electrical system of the towing vehicle. It should be understood that the present teachings are not limited to any number of inputs and outputs. Any such number of inputs and outputs may be sensed by the sensor assemblies 100.

The electrical converter 20 may be used with any appropriate lighting system of the towing and towed vehicle, such as two and three-wire systems. By way of a non-limiting example, the converter 20 may be operatively used with a three wire system of the towing vehicle to a two-wire system of the towed vehicle. In these configurations, there may be three light inputs from one side of the towing vehicle and three light inputs from the other side of the towing vehicle. The electrical converter 20 may be operatively engaged with the lighting systems of both sides of the towing vehicle and may be capable of activating or triggering the appropriate signal on the towed vehicle. For example, tail, stop and turn (left or right) may be in one wire of the towing vehicle and the electrical converter 20 may be operatively coupled to such. In addition or in the alternative, the electrical converter 20 may be used with a two-wire system of the towing vehicle and a two-wire system of the towed vehicle. Similarly, in these configurations, the electrical converter 20 may be operatively engaged with the lighting systems of both sides of the towing vehicle and may be capable of activating or triggering the appropriate signal on the towed vehicle. For example, stop and turn (left or right) may be in one wire of the towing vehicle and the electrical converter 20 may be operatively coupled to such. It will be further appreciated that the electrical converter 20 may be used with systems that utilize one or more pulse width modulated (PWM) signal wires. The electrical converter 20 may sense the PWM signal on one or more wires and may appropriately convert the signal to the towed vehicle.

The sensor assembly 100 may be structured such that it may be non-invasive or contactless with the electrically conductive elements of the electrical system or lighting system of the towing vehicle. More specifically, the sensor assembly 100 may be secured to the lighting system or other systems of the towing vehicle without having to utilize: mating connectors that are specific to the connectors of the vehicle harness; insulation displacement connectors; or self-striping electrical tap connectors, such as for example Scotchlok type connectors. The sensor assembly 100 may be capable of engaging or coupling with the applicable wire W of the electrical system of the towing vehicle without having to splice, displace, or otherwise be inserted through the insulation of the wire W. A non-invasive sensor 100 may be configured to sense any number of signals in a multi signal system. For example, a non-invasive sensor may be arranged to sense the current in a single wire of a two-wire system, or a single wire of a three-wire system, or only a PWM signal wire of any wiring system. Further, it will be appreciated that any number of non-invasive sensors may be used as desired to provide the appropriate signal detection.

The electrical converter 20 may include any appropriate number of sensor assemblies 100. In one non-limiting example, four sensor assemblies 100 may be used with the electrical converter 20. In these embodiments, each sensor assembly 100 may sense or detect a predetermined activation of a signal (indicative of an operating characteristic) on the towing vehicle. For example, one sensor assembly 100 may sense activation of the left turn signal of the towing vehicle; another sensor assembly 100 may sense activation of the right turn signal of the towing vehicle, another sensor assembly 100 may sense activation of the stop light(s) of the towing vehicle, and another sensor assembly 100 may sense activation of the taillight(s) of the towing vehicle. Each such sensor assembly 100 may be engaged with or otherwise in close proximity to the wire used in activation of such signal.

In some embodiments, the sensor assembly 100 may include a housing 102. The housing 102 may be made of any appropriate material, such as by way of a non-limiting example, plastic, rubber or the like. The housing 102 may be of any appropriate shape, such as for example, it may be a general parallelepiped.

The sensor assembly 100, or more specifically, the housing 102, may be made of two components that may be secured together in any appropriate manner, such as by way of a non-limiting example, with a screw or clip or other mechanical means. In these embodiments, the housing 102 may include a body 106 and a cap 110. The cap 110 may be pivotally attached to the body 106, or in the alternative may be selectively detachable from the body 106. The cap 110 being capable of pivoting relative to the body 106 may open and close the housing 102 as needed to engage and/or disengage the wire W. The cap 110 may be pivotally attached to the body 106 in any appropriate manner, such as for example, one end may be integrally formed with the body 106, one end may be fastened, welded, or the like to the body 106. Alternatively, the housing 102 may be an integrally formed member.

The housing 102 may further include a wire holding portion such as channel 116. The channel 116 may be of a shape and size to generally hold an appropriate towing vehicle wire W as shown in FIGS. 2 and 3. Still further, the cap 110 may be able to pivot towards the body 106 and close around the wire W to generally hold the wire W within the housing 102 so as to secure the sensor assembly 100 on to the wire W. The housing 102 may generally be capable of holding the sensor assembly 100 in close proximity to the wire W.

The sensor assembly 100 may include a locking device 120 that may generally prevent the cap 110 from pivoting open or otherwise disengaging from the body 106 so that the vehicle wire W may remain held within the sensor assembly 100 or more specifically, within the housing 102. In some embodiments, the locking device 120 may include a tab 124 that may be attached to the body 106. The tab 124 may be attached in any appropriate manner. By way of a non-limiting example, the tab 124 may be integrally formed with the body 106, fastened, welded or the like to the body 106. Still further, the locking device 120 may be of any appropriate construction, an example of which may include any kind of mechanical lock.

The locking device 120 may include a locking aperture 128 that may be positioned on the cap 110. The locking aperture 128 may be integrally formed with the cap 110 or may be added through a subsequent operation. The locking aperture 128 may be shaped and sized to engage the tab 124 when the cap 110 is pivoted toward the body 106. In these embodiments, the locking aperture 128 may engage the tab 124 to generally prevent the cap 110 from pivoting away from or otherwise being removed from the body 106. In other embodiments, the locking device 120 may be any appropriate mechanism that may generally keep the cap 110 in position on the body 106 and may otherwise generally keep the wire W operatively engaged with the sensor assembly 100.

The sensor assembly 100 may further include a core 134 made of a material that may have a generally high magnetic permeability, such as by way of a non-limiting example ferrite/iron. The ferrite core 134 may generally be positioned within the housing 102. In some embodiments, the ferrite core 134 may be of a generally toroid shape and may include a first ferrite core portion 136, a second ferrite core portion 138, and a third ferrite core portion 139. The ferrite core 134, however, may be of any appropriate shape and is not limited to having a generally toroid shape, such as for example, generally circular, rectangular, square, oval or any other appropriate shape. The shape of the ferrite core 134 may be determined by manufacturing processes available, packaging to be used, or the like. The first ferrite core portion 136 may generally be positioned within the cap 110. The second and third ferrite core portions 138, 139 may generally be positioned within the body 106. This may result in the first, second, and third ferrite core portions 136, 138, 139 being adjacent when the cap 110 is pivoted toward the body 106 forming the generally toroid shape. The first, second, and third ferrite core portions 136, 138, 139 may be attached to the cap 110 and body 106, respectively in any appropriate manner. In some embodiments, the first ferrite core portion 136 may be molded into the cap 110 and the second and third ferrite core portions 138, 139 may similarly be molded into the body 106. While three ferrite core portions 136, 138, and 139 are shown, any appropriate number of ferrite cores may be used, such as for example, two, four, five, or the like.

The sensor assembly 100 may include an output member that may operatively couple the sensor assembly 100 with the components within housing 25 of electrical converter 20, such as for example a plurality of wires 140. As shown in FIGS. 2 and 3 three such wires 141, 142 and 143 may form the plurality 140 and may extend from the body 106 to the components within housing 25. Alternatively, any appropriate number of wires may extend from the body 106.

In some embodiments, the wire 140 may include a three-ribbon wire that may extends from the body 106. The ribbon wire 140 may be inserted into the body 106 or alternatively, may be formed with the body 106, such as molding it therewith. In these embodiments and as shown in FIGS. 2, 3 and 5, the 3-ribbon wire 140 may include a first wire 141 that supplies power to sensor assembly 100, a second wire 142 that may be a ground, and a third wire, 143 that may transfer an output from sensor assembly 100. The wires 140, however, are not limited to this configuration and may be any appropriate configuration. In some embodiments, the wires 140 may include four or five wires, some of which may be operatively coupled with a communication and/or data line or data bus.

As shown in FIG. 5, the sensor assembly 100 may include a printed circuit board 144 that may be operatively coupled to the wires 140. In these embodiments, the printed circuit board 144 may be held within the housing 102, or more specifically it may be held within the body 106. The printed circuit boards 144 may include the required electrical configuration so that the sensor assembly 100 may operate as intended.

The sensor assembly 100 may further include a current sensing device 148 that may be positioned within the housing 102. In some embodiments, the current sensing device 148 may be positioned within a slot or gap 155 of the ferrite core 134 and may be operatively coupled with the printed circuit board 144. The current sensing device 148 may be capable of sensing a magnetic field produced by electric current flowing in the wire W, which may indicate the activation of a pre-selected function on the towing vehicle, such as by way of a non-limiting example, the left turn signal. The current sensing device 148 may be positioned in a magnetic path created through the ferrite core 134 in response to the current flowing in the wire W. The magnetic field may be increased by utilizing the ferrite core 134 for conduction of the magnetic field, which may also reduce the reluctance. The current sensing device 148 may, therefore, be generally surrounded by the ferrite core 134. The current sensing device 148 may produce a signal or output in response to detecting the current flow in wire W. The signal or output may be used by converter 40 to activate or trigger a response in the electric system of the towed vehicle.

The current sensing device 148 may be any appropriate device that may be capable of sensing the presence of a current without having to invade the wire W, such as a transducer. In some embodiments, the current sensing device 148 may be a linear Hall Effect sensor. The linear Hall Effect sensor may be any appropriately sensitive linear Hall Effect sensor. In some embodiments, a Hall Effect sensor that may be capable of detecting the magnetic field produced by very small amounts of current may be used. In other embodiments, a digital Hall Effect sensor may be used. The digital Hall Effect sensor may be capable of detecting the presence of current in the wire W and produce an output signal of on or off. In other embodiments, an analog Hall Effect sensor may be used. The analog Hall Effect sensor may detect current flow in wire W and have an output in the proportion to the current flow in the wire W. Still further, a smart Hall Effect sensor may be used. The smart Hall Effect sensor may be capable of serial or parallel communication with a communication bus to convey the presence of current flow in wire W. to the converter or other electrical system of Towing or Towed vehicle.

The current sensing device 148, however, is not limited to the Hall Effect sensor shown and described. The current sensing device 148 may utilize any appropriate transduction technique using the magnetic field produced by the current in the wire W when the appropriate signals are active, such as the left, right, stop and tail signals. By way of a non-limiting example, the current sensing device 148 may be a magnetoresistive sensor, or a device otherwise inductively coupling a magnetic field produced by the current in the wire W, or any other appropriate method or device to sense the magnetic field produced by the current flow in the wire W.

In some embodiments, a plurality of current sensing devices 148 may be used, which may permit the sensor assembly 100 to sense lower amounts of current flow in the wire W. By way of a non-limiting example, two Hall Effect sensors may be used. In these exemplary embodiments, the two Hall Effect sensors may be positioned within the slot 155 of the ferrite core 134. Still further, additional current sensing devices 148 may be used in the sensor assembly 100 such that the sensor assembly 100 may detect even lower amounts of current flow.

In the embodiments shown, the Hall Effect sensor 148 may be operatively coupled with the printed circuit board 144. The ferrite core 134 may be generally positioned around the Hall Effect sensor 148 such that the Hall Effect sensor may be positioned in the slot/gap 155 of the ferrite core 134 and a wire (not shown) that may be positioned through the channel 116 in the ferrite core 134. In these embodiments, the Hall Effect sensor may be positioned in the slot/gap 155 of the ferrite core 134 in such a manner that it may be exposed to a maximum magnetic flux density as a result of the magnetic field resulting from the current flow in the wire W. This may help maximize the output from the Hall Effect sensor, which may help provide an improved signal-to-noise ratio. The ferrite core 134 may be capable of concentrating the flux so that it is in the range required for an output with good signal-to-noise ratio from the Hall Effect sensor 148.

As shown in FIG. 4, the sensor assembly 100 may be formed through any appropriate process, such as by way of non-limiting examples, potting, injection molding, compression molding, insert molding or any appropriate molding process. The sensor assembly 100 is not limited to any specific forming process. In some embodiments, the housing 102 of the sensor assembly 100 may be formed through an insert molding/overmolding process. In these embodiments, the sensor assembly 100 may include an inner overmold 200. The inner overmold 200 made be formed to hold the ferrite core 134 and Hall Effect sensor 148 in the appropriate position within the housing 102. The printed circuit board 144 may be immediately below the inner overmold 200, or alternatively may be held within the inner overmold 200. A top core 204 may be formed where the top core 204 may include the top ferrite core portion 136 of the ferrite core 134 and may be positioned generally above the inner overmold 200. A bottom and top overmold 210, 214 may be formed to encompass the inner overmold 200, printed circuit board 144, ferrite core 134, and wires 140. The bottom and top overmold 210, 214 may generally form the housing 102, or more specifically may form the body 106 and the cap 110. While the overmolding process has been shown and described, the present teachings are not limited to this process. Any appropriate process may be used to form the sensor assembly 100.

In operation, the sensor assembly 100 may sense or otherwise detect the presence of an active input signal from the electrical system of the towing vehicle and may output an appropriate signal that the electrical converter 20 uses to activate or trigger a corresponding response in the electrical system of the towed vehicle. By way of a non-limiting example, the sensor assembly 100 may detect the presence of an active input signal on left, right, stoplight, reverse, and tail channels (or any other appropriate input signal) of the electrical system of the towing vehicle by detecting the current flow through the applicable wire W of the towing vehicle. The sensor assembly 100 may detect DC currents and pulse width modulated (PWM) currents, which is described in more detail in U.S. Publication No. 2009/0302858, which is hereby incorporated herein by reference. Moreover, the sensor assembly 100 may detect the current flow regardless of the towing vehicle lamp load being an incandescent light or light emitting diode (LED). The dynamic range of the sensor's 100 ability to detect a current may be wide so that it may accommodate the difference in loads between an incandescent light and an LED. For example, an incandescent light may carry much more current, such as 2 A or 20 A, which would make detecting the current flow easier, while an LED light may carry less current, such as 50 mA, which may be more difficult to detect. The sensor assembly 100, therefore, may be configured to have the ability to detect current for both an incandescent light and an LED light. Alternatively, two different sensors 100 may be configured—one for incandescent load and one for LED loads on a towing vehicle. In these embodiments, the electrical converter 20 may include two sets of sensor assemblies 100 where one set of sensor assemblies 100 is used for incandescent load and one set of sensor assemblies 100 is used for LED load. In addition, the sensor assembly 100 may include two current sensing devices 148, such as for example, two Hall Effect sensors, which may create enough sensitivity to detect the current flow in LED lighting systems. The single Hall sensor assembly may be capable of sensing current over 150 mA or 0.15 A. Still further any appropriate number of current sensing devices 148 may be used within the sensor assembly 100 depending upon the appropriate sensitivity that may be required for the sensor assembly 100. In addition, the electrical converter 20 may utilize any appropriate number of sensor assemblies 100 to accomplish the appropriate sensitivity required for the electrical converter 20.

Figure 6:
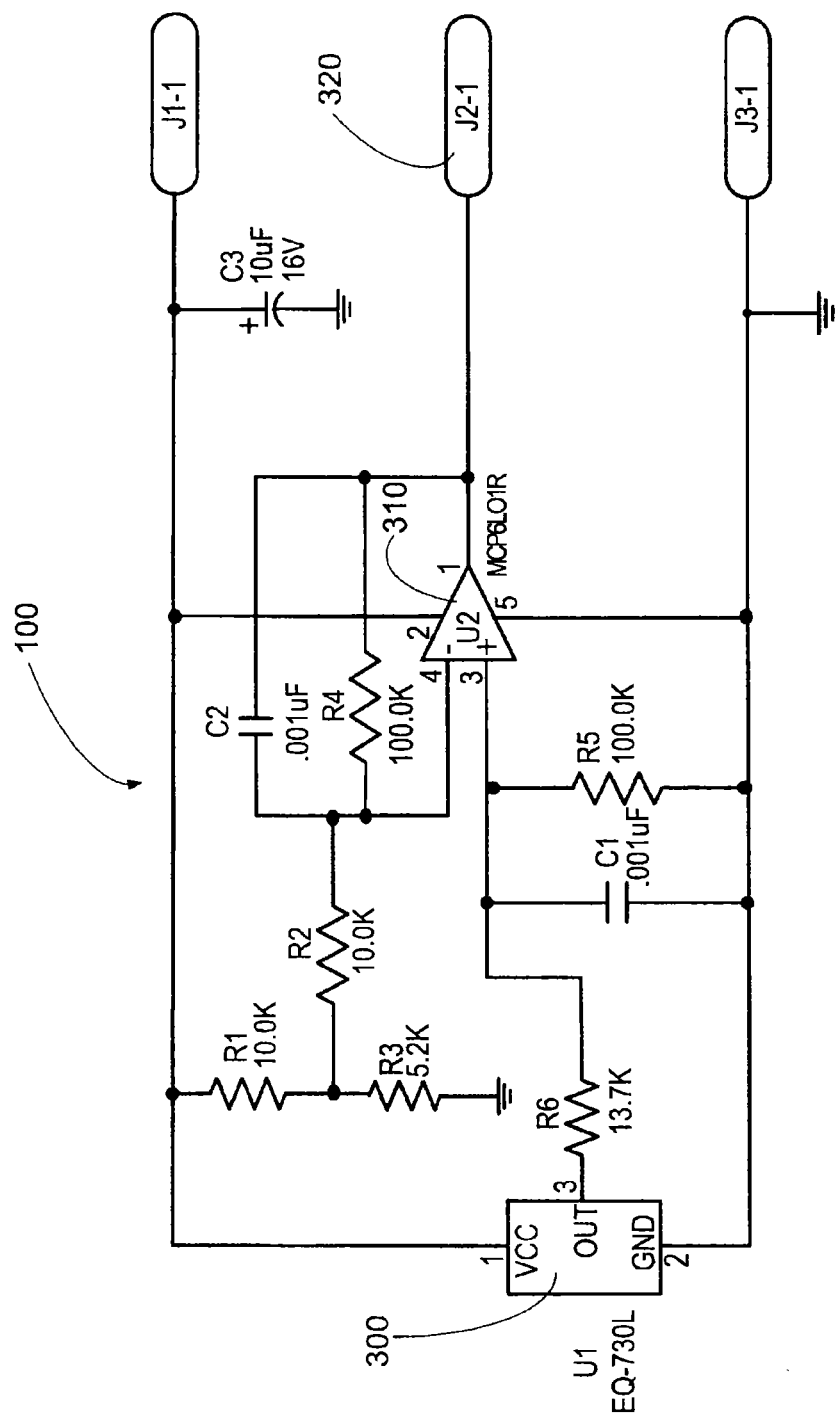
FIG. 6 is an electrical schematic of an embodiment of a sensor assembly for an electrical converter.

FIG. 6 shows an electrical schematic of an implementation of the sensor assembly 100, which may be specifically used for sensing incandescent loads. As shown, element 300 identifies the current sensing device 148, such as a linear Hall Effect sensor. The sensor assembly 100 may also include an operational amplifier 310 that may amplify the signal from the Hall Effect sensor 148. Finally, the amplified output of the Hall Effect sensor 148 is shown as 320. The sensor assembly 100 is not limited to that shown in FIG. 6. The sensor assembly 100 may be formed using any appropriate electrical configuration.

Figure 7:
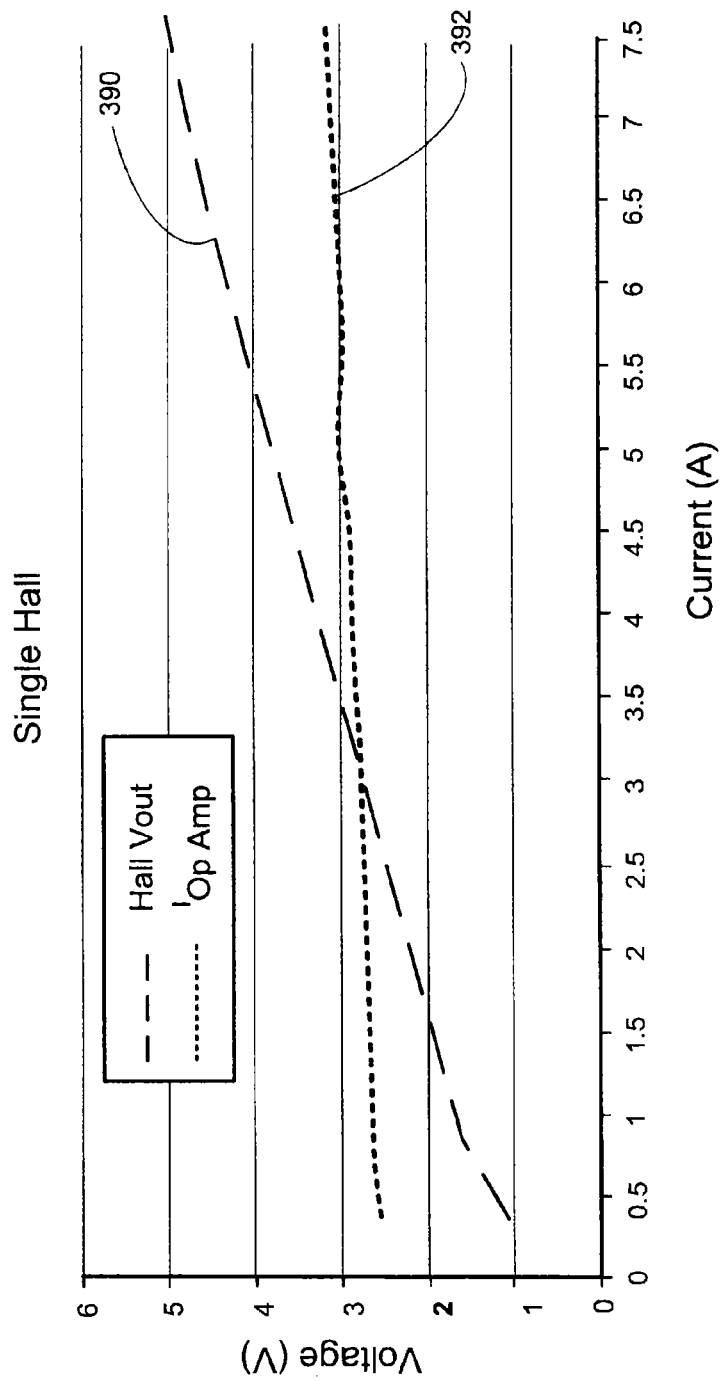
FIG. 7 is a graph of an output and amplified output of an embodiment of a sensor assembly for an electrical converter.

Shown in FIG. 7 is a graphical representation of the output 390 of a sensor assembly 100 that utilized a single current sensing device 148, or more specifically utilized a single Hall Effect sensor. In this embodiment, the Hall Effect sensor was bidirectional and had an output 392 as shown. The operational amplifier 310 may amplify the output 392 as shown. As the current was detected by the Hall Effect sensor, the output of sensor assembly 100 may be sent to the electrical component in housing 25 and used by the electrical converter 20 to activate or trigger a desired response in the electrical system of the towed vehicle. This signal may indicate the activation of a particular signal on (or operating characteristic of) the towing vehicle.

Figure 8:
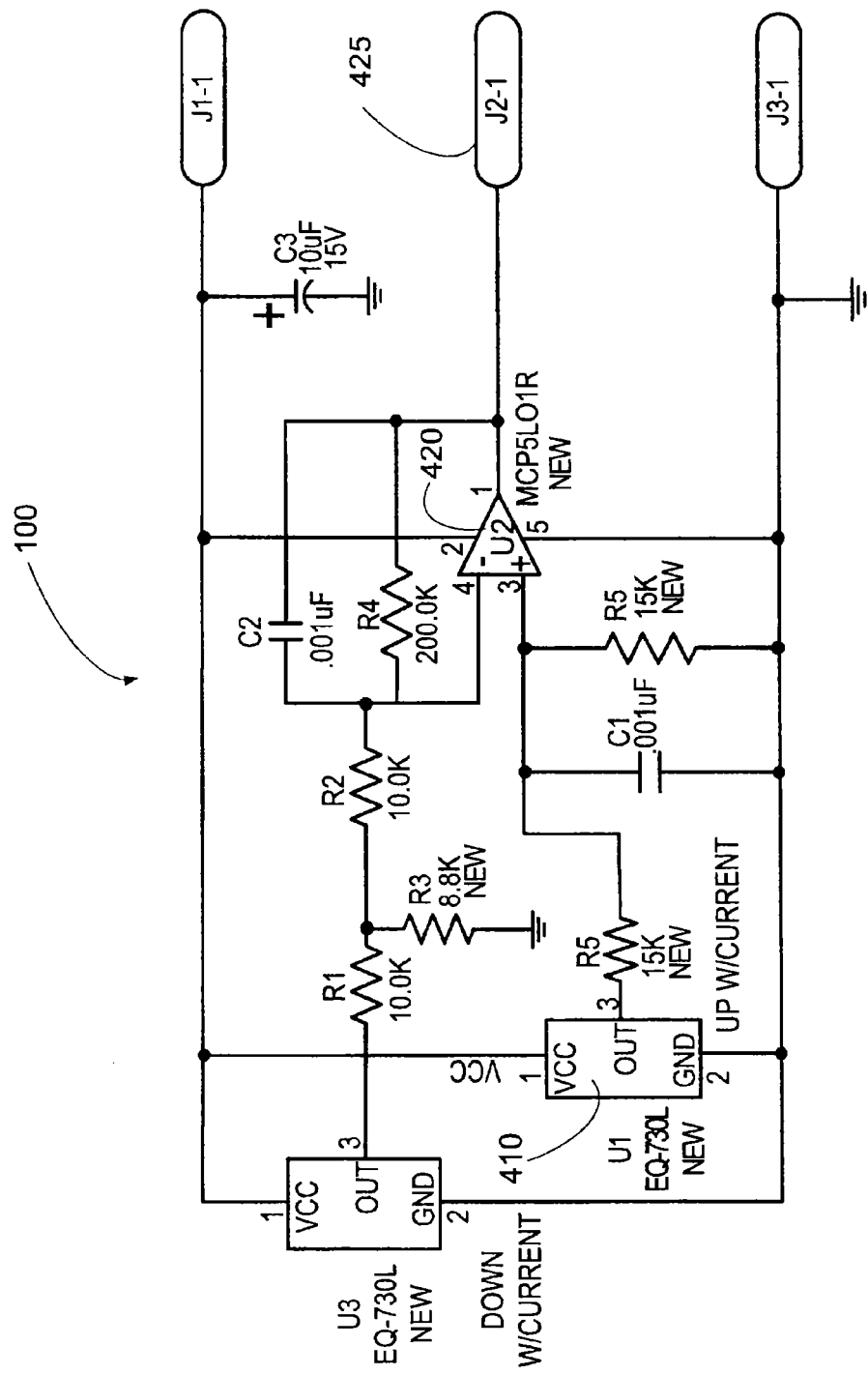
FIG. 8 is an electrical schematic of an embodiment of a sensor assembly for an electrical converter.

FIG. 8 shows an alternative exemplary electrical schematic of another embodiment of the sensor assembly 100. This exemplary schematic may be particularly useful for sensing LED loads. As shown, the sensor assembly 100 may include a first and second current sensing device, such as first and second Hall Effect sensors 410, 414. The sensor assembly 100 may also include an operational amplifier 420 that may amplify the signals from the first and second Hall Effect sensors 410, 414. The Hall Effect sensors 410, 414 may be configured such that the voltage on the output of the first Hall Effect sensor 410 increases when the current flow in wire W increases and the voltage on the output of the second Hall Effect sensor 414 decreases when the current flow in wire W increases. These two outputs may be connected in a differential mode and may be amplified by the operational amplifier 420 into a single output 425. The output of the amplifier 420 may thus be increased versus using just one Hall Effect sensor. This may increase the signal-to-noise ratio of the output signal. The amplification stage may further provide filtering. In these embodiments, the Hall Effect sensors may be positioned in generally opposite directions with each other with outputs connected in differential mode for further amplification. In some other embodiments, one or more of such pairs of Hall effect sensors positioned in opposite direction may be arranged with their amplified outputs summed to achieve further improvement in signal-to-noise ratio. As an alternative, the Hall Effect Sensors may be positioned so their outputs change in the same direction and the outputs then summed for further amplification. One or more of such pairs of Hall effect sensors positioned in same direction may be arranged with their amplified outputs summed to achieve further improvement in signal-to-noise ratio.

Figure 9:
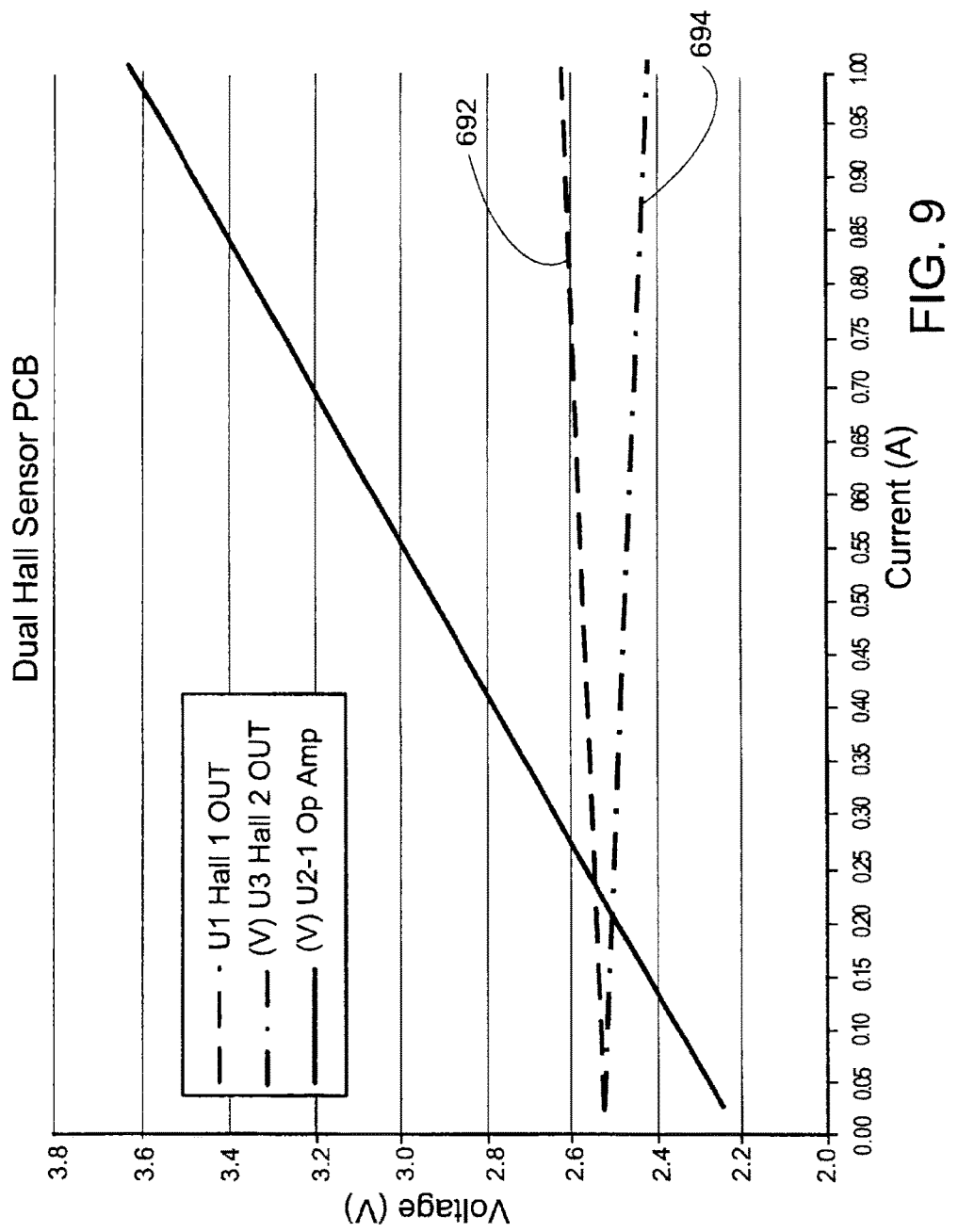
FIG. 9 is a graph of an output and amplified output of another embodiment of a sensor assembly for an electrical converter.

Shown in FIG. 9 is a graphical representation of an output 690 of a sensor assembly 100 that utilized two current sensing devices 148 or more specifically utilized two Hall Effect sensors. As previously noted, this configuration is particularly suited for use with LED lights. In this embodiment, the Hall Effect sensors are bidirectional. The Hall Effect sensors 410, 414 may be configured such that the voltage on the output 692 of the first Hall Effect sensor 410 increases when the current flow in wire W increases and the voltage on the output 694 of the second Hall Effect sensor 414 decreases when the current flow in the wire W increases. These two outputs 692, 694 may be connected in a differential mode and may be amplified by the amplifier 420 to produce output 690. The output 690 of the amplifier 420 may thus increase versus using just one Hall Effect sensor as shown (compare FIGS. 7 and 9). The signal 425 may be sent to electrical components in housing 25 for use by the electrical converter 20. If the value of this signal is over a threshold, it may indicate the activation of a particular signal on the towing vehicle and electrical converter 20 may activate or trigger a corresponding response in the electrical system of the towed vehicle.

The output voltage of the sensor assembly 100 may vary as a function of the current flowing in the wire W. A voltage comparator (not shown) may be included in the sensor assembly 100, or more specifically, may be included in the printed circuit board 144. The voltage comparator may be used to compare the voltage from the sensor assembly 100 before detecting current flow in wire W and after detecting current flow in the wire W. The voltage at the output of the current sensing device 148 before detecting current flow in wire W plus a fixed voltage may be used as a threshold voltage that converter 20 may use as an indicator to activate or trigger a response in the electrical system of the towed vehicle. The output of the comparator may turn on when the output of the current sensing device 148 exceeds the threshold voltage. By way of a non-limiting example, the output 425 of the Hall Effect sensor assembly 148 may be compared with the threshold to determine that sensor assembly 100 has detected a current flow in the wire W of greater than 0.05 Amps. This threshold, however, may be any appropriate level and is quoted herein for reference only. The detection of the threshold may be accomplished by the electrical converter 20 and may be in hardware using a comparator or in software using an analog input of a micro-controller, by way of non-limiting example.

Figure 10:
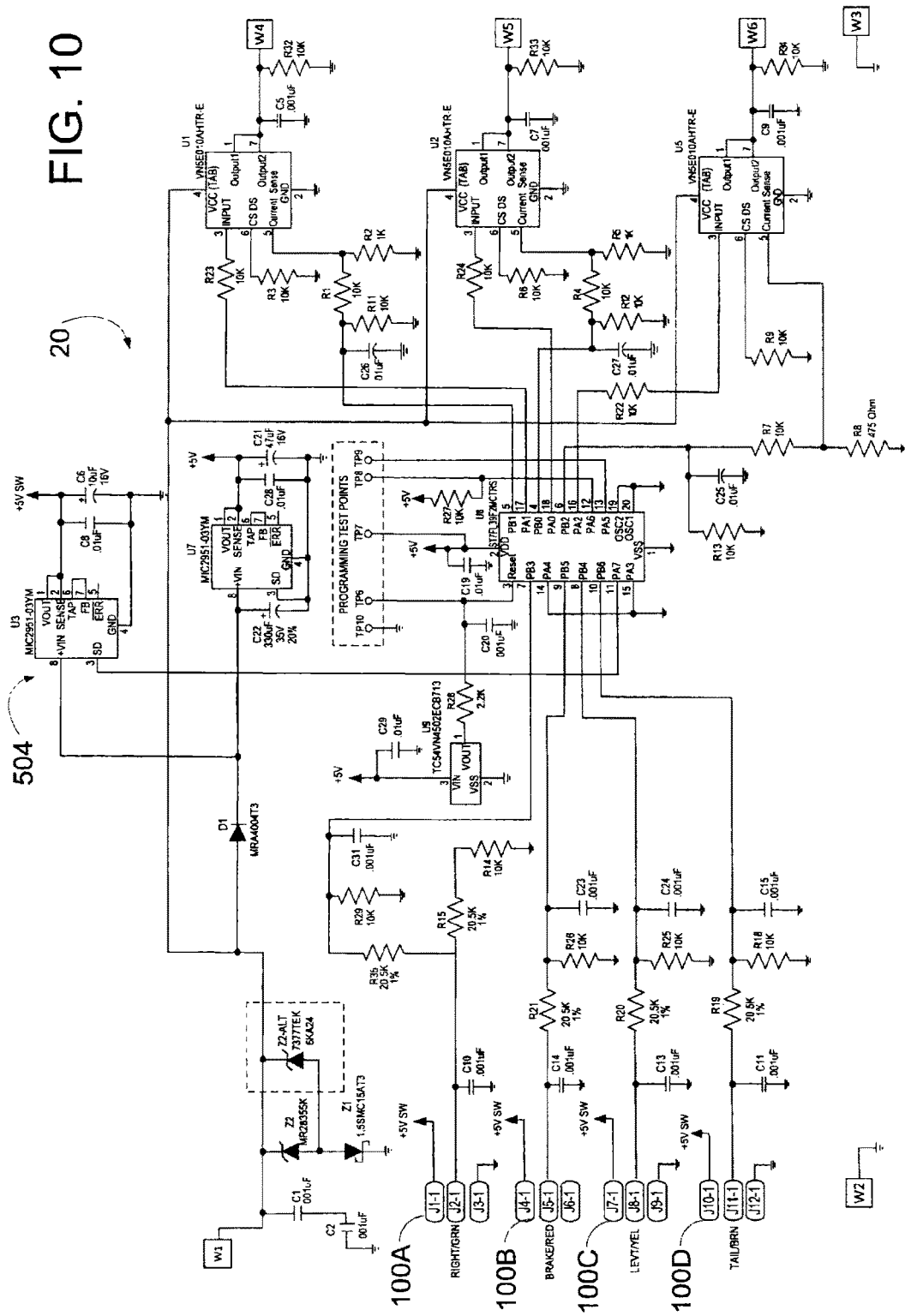
FIG. 10 is an electrical schematic of an embodiment of an electrical converter.

FIG. 10 is an electrical schematic of an embodiment of the electrical converter 20 using sensor assemblies 100. In this embodiment, there may be four sensor assemblies 100 used. By way of a non-limiting example, a first sensor assembly 100A may be secured to a wire of the electrical system of the towing vehicle to detect activation of the right turn signal, a second sensor assembly 100B may be secured to a wire of the electrical system of the towing vehicle to detect activation of the brake light signal, a third sensor assembly 100C may be secured to a wire of the electrical system of the towing vehicle to detect activation of the left turn signal, and a fourth sensor assembly 100D may be secured to a wire of the electrical system of the towing vehicle to detect activation of the tail channel. In some embodiments, the electrical converter 20 may utilize three sensor assemblies 100 that may include a single current sensing device 148 and a fourth sensor assembly 100 that may utilize two current sensing devices 148. In these embodiments, the three sensor assemblies 100 may be used to detect operation of the left and right turn signals and the stoplight and the fourth sensor assembly 100 may be utilized to detect the taillight, which may require detection of 0.05 A, by way of non-limiting example.

In those embodiments of the electrical converter 20 in which there may be a plurality of sensors 100, if those sensors are left continuously on, the current draw of electrical converter 20 may cause an undesirable drain on the battery of the towing vehicle over time. To prevent this, the sensor assemblies 100 may be sampled, or more specifically, the current sensing devices 148 may be sampled. By way of a non-limiting example, power to the current sensing devices 148, such as the Hall Effect sensors 148, may be powered off after sampling them. The current sensing devices 148 may then be turned on prior to sampling. Doing this may reduce the average power/current used. By way of a non-limiting example, a switch 504 may be utilized to switch the power outputs to sensor assemblies 100 on and off. Switching the power outputs may be done to cause the average quiescent current of the entire assembly, including all sensors 100, to be less than 1 mA. In an embodiment, switching the power outputs may cause the average quiescent current of the entire assembly, including all sensors 100, to be less than 100 uA. The quiescent current of the Hall Effect sensor is typically 5-10 mA. Further, power to each sensor can be turned on/off individually and not all the same time as shown in the illustrative schematic.

Figure 11:
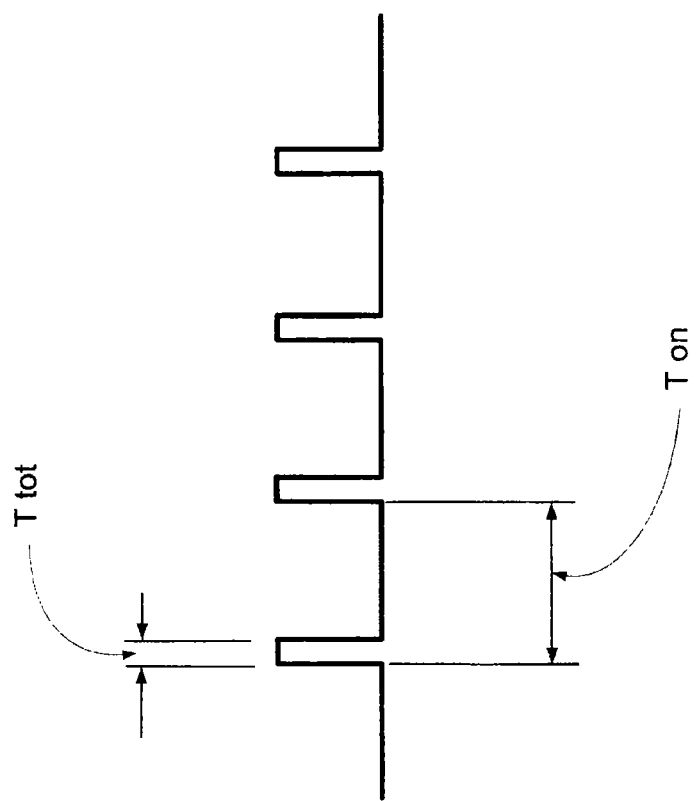
FIG. 11 is a graphical representation of an exemplary timing chart of the powering and sampling of a sensor assembly for an electrical converter.
Figure 12:
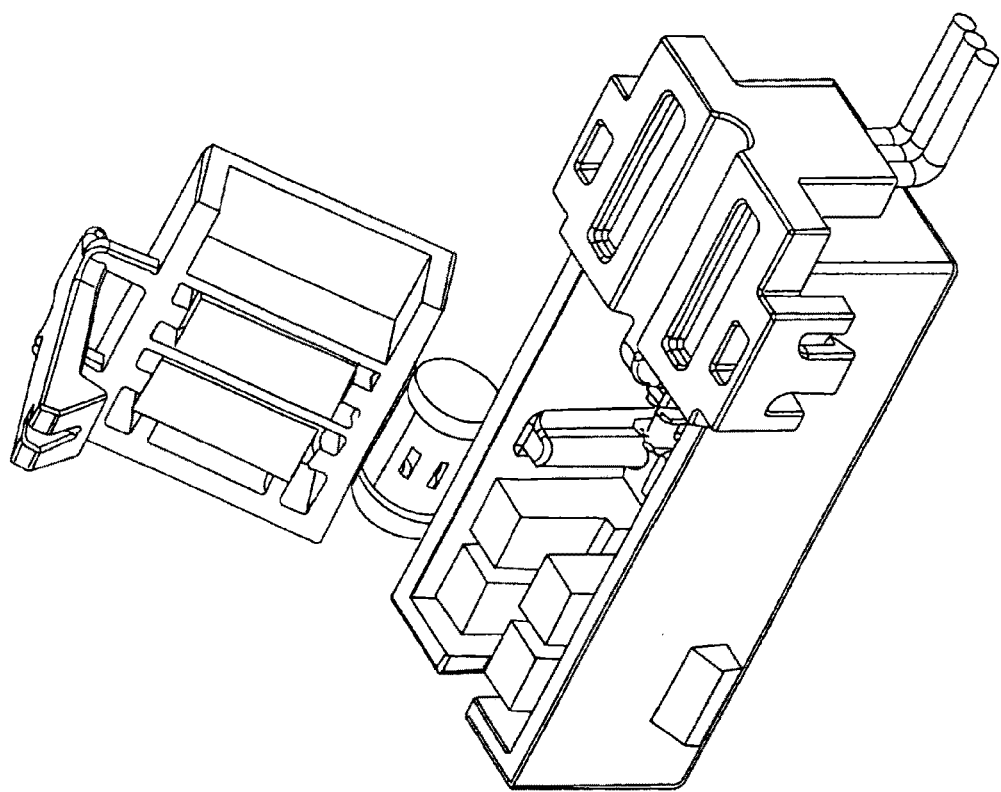
FIGS. 12-16 are configurations of a sensor assembly.
Figure 13:
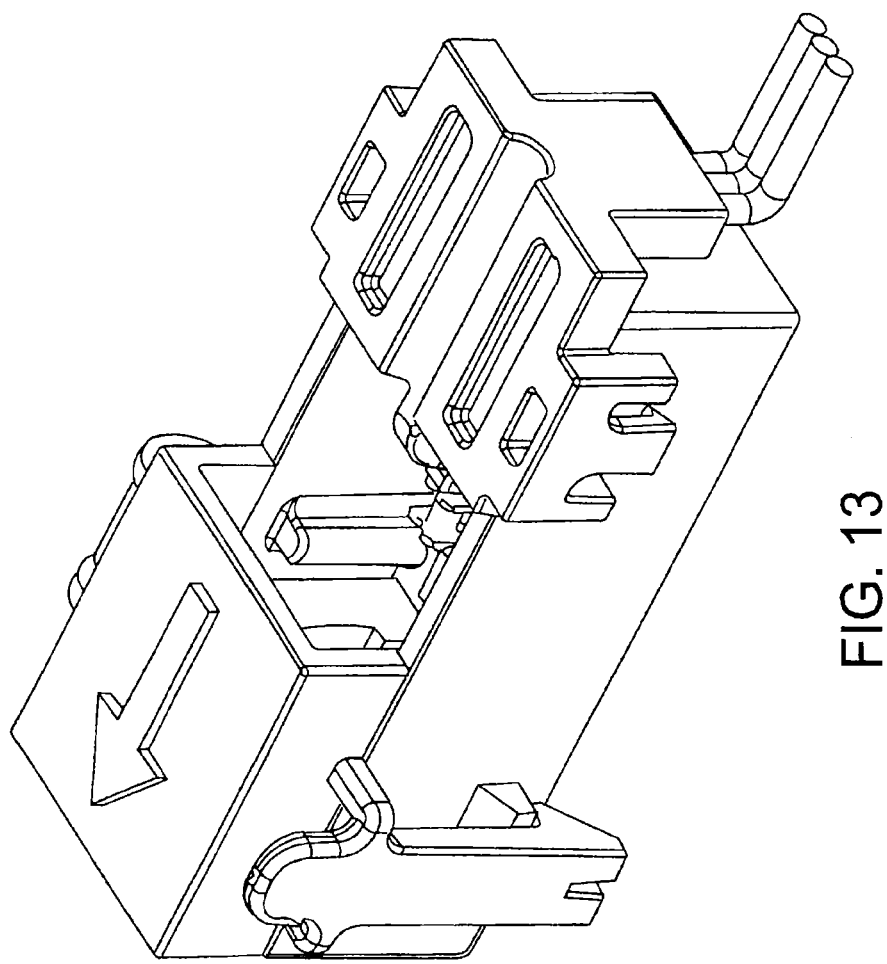
Figure 14:
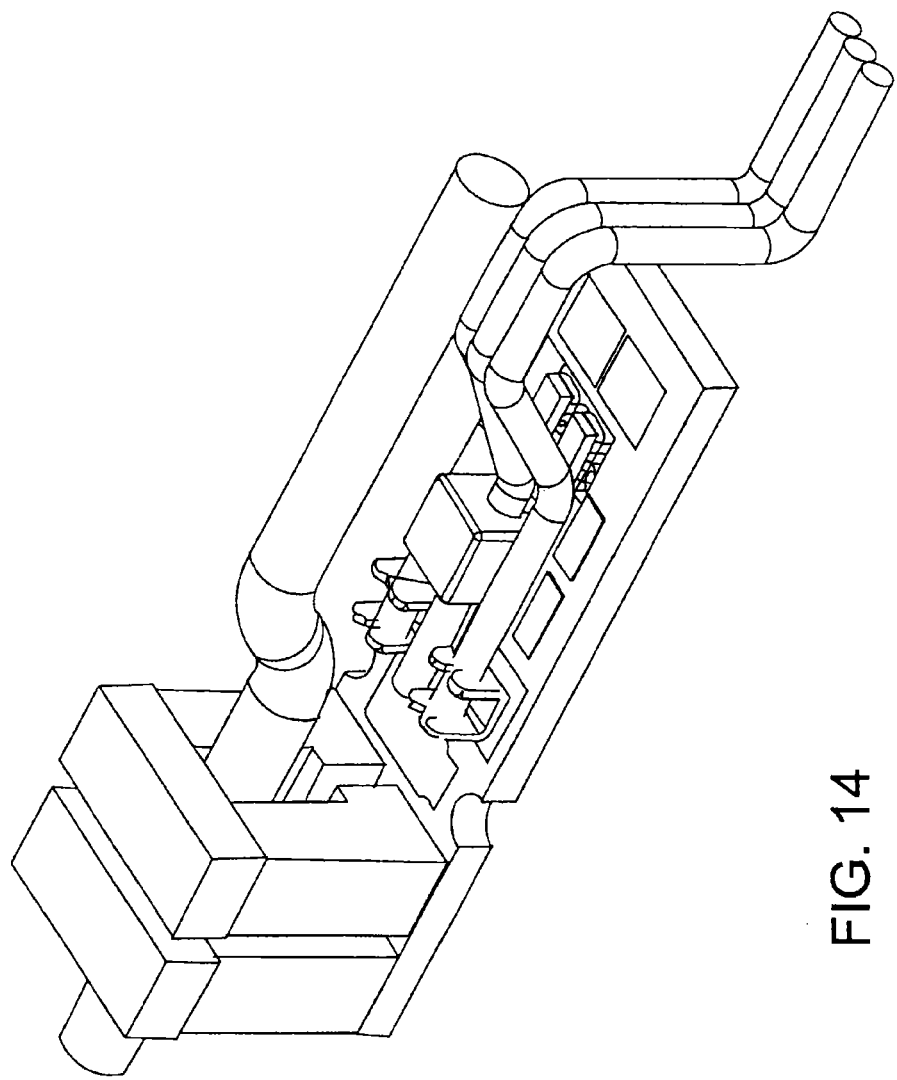
Figure 15:
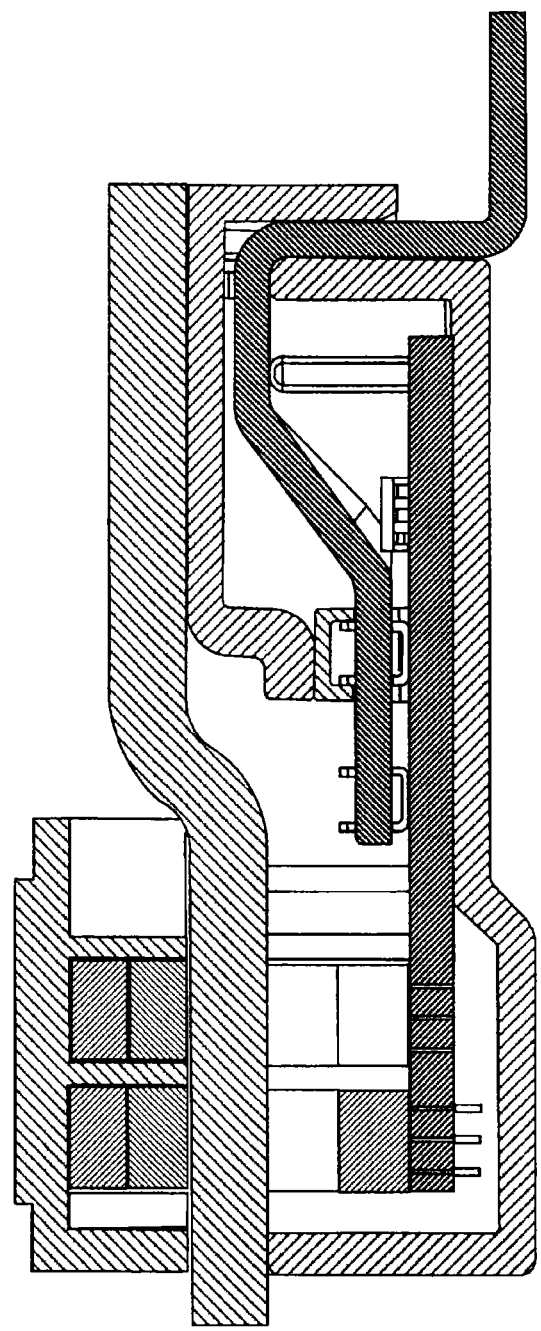
Figure 16:
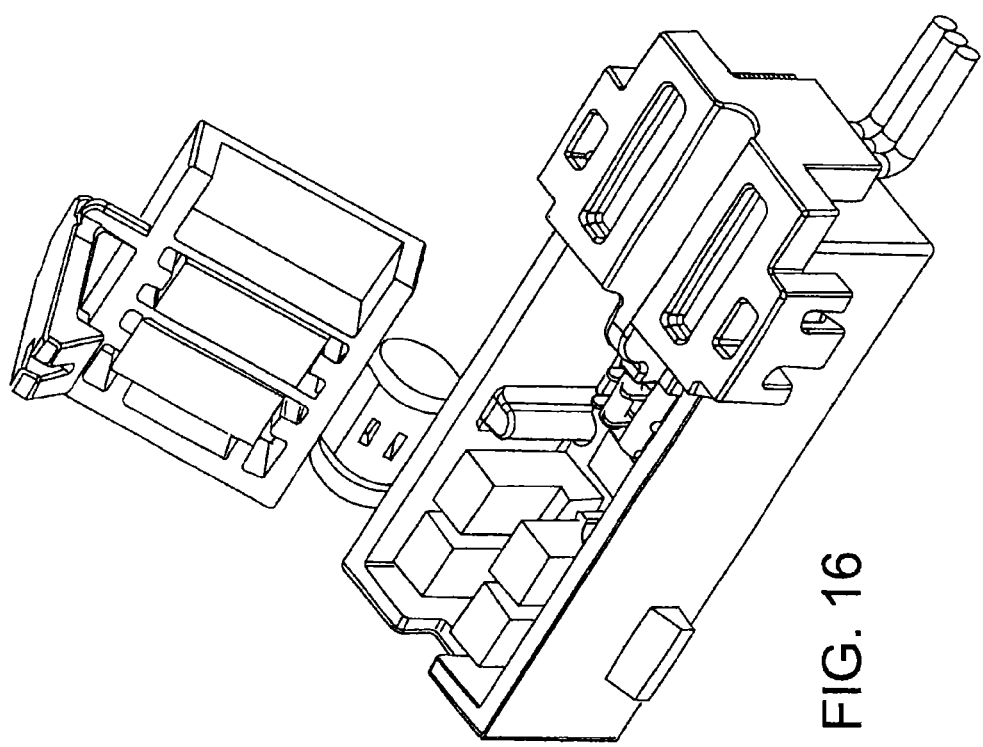

A graphical representation of this sampling is shown in FIG. 11. The timing chart shown is an example of the Hall Effect sensor 148 being powered and sampled periodically so that it may reduce the average current consumption. As shown, the average current consumption equals I_module+ 4×I_sensor×T_on/T_tot. I_module is the current consumption of the control module, which also uses 'periodic wake-up' techniques or other similar methods, such as the use of interrupts, to keep the average current down. I_sensor is the current drawn by one sensor assembly 100. T_on is the time the power to the sensor module is ON. T_tot is the total sampling time.

Figure 17:
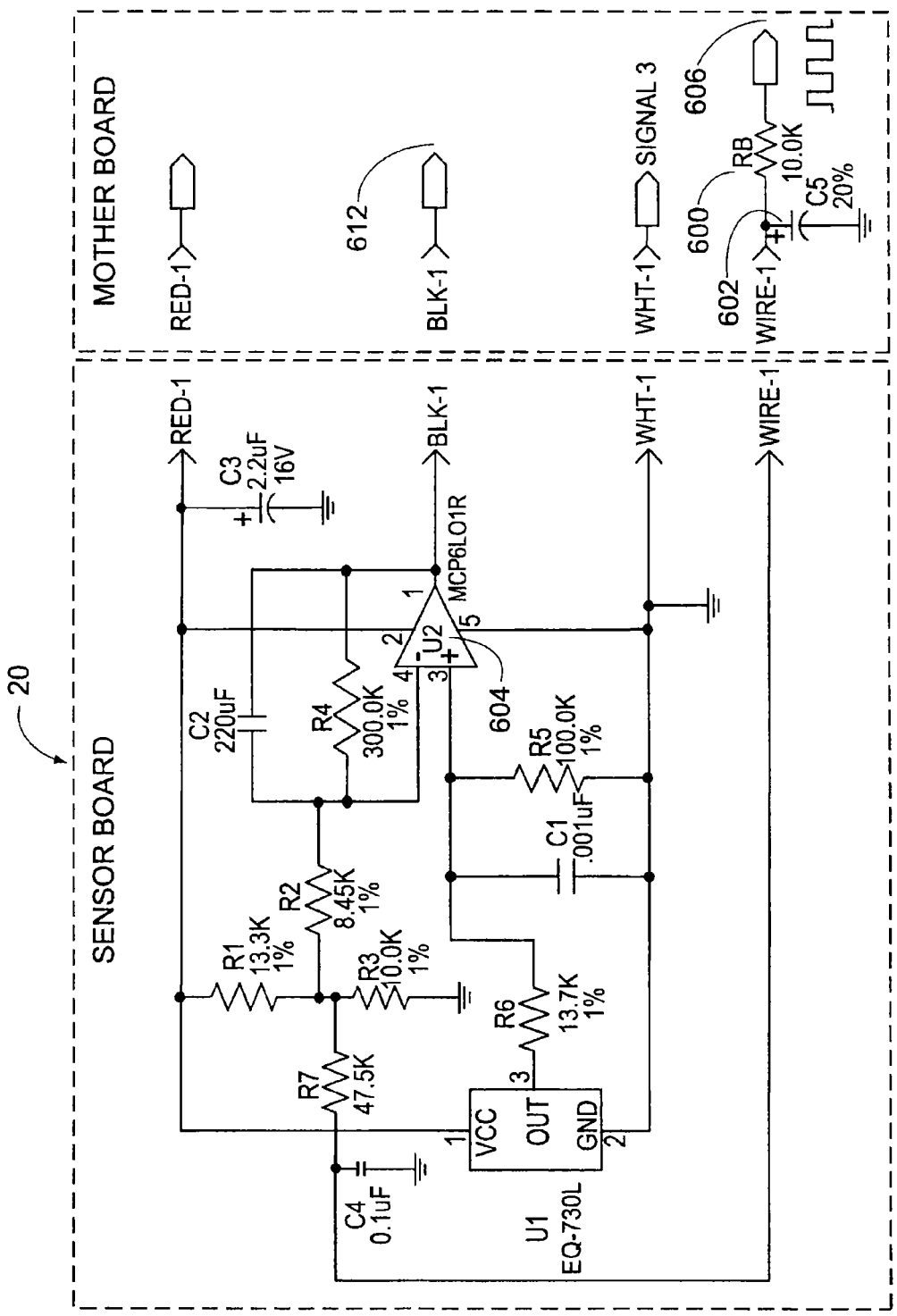
FIG. 17 is an electrical schematic of an embodiment of an electrical converter.

FIG. 17 shows an electrical schematic of an implementation of the sensor assembly 100 that may adaptively adjust or null the offset to accomplish high gain in the sensor to sense the low currents of LED lamps in the towing vehicle. The signal 606 from the convertor module may be a PWM control signal that is filtered by a resistor 600 and a capacitor 602. The average voltage may then be sent to an inverting input of an operational amplifier 604. Normally, the amplifier is biased to have a guaranteed positive output. The output can be set at a fixed level by monitoring the output of signal 612 output when there is no current flowing in the sensor and varying signal 606 until a known output is obtained at the output signal 612. This nulls the offset of sensor and operational amplifier 604. Under these conditions, a high gain can be obtained with the amplifier 604. This will allow sensing low currents, thus increasing the sensitivity of the circuit. This will facilitate detecting turning ON/OFF of LED lamp circuits in the vehicle. It will be appreciated that the sensor assembly 100 is not limited to that shown in FIG. 17, and the sensor assembly 100 may be formed using any appropriate electrical configuration.

The nulling of the offset may be done during manufacturing. The value of signal 606 from the convertor module required to obtain the nulling of the offset as described above can be stored in EEPROM for use at a later time. However, adaptive trimming of the offset can be done in real time for further adjustments for changes of offset with temperature and other factors In an embodiment, the electrical converter 20 may include at least one sensor 100 to monitor the break light or tail light of the towing vehicle. The sensor 100 will thus detect a current flow when the brakes of the towing vehicle are applied and a tail or brake light is lit. The electrical converter 20 may then send a signal to the brakes of the towed vehicle. For example, the electrical converter 20 may receive additional inputs, such as an accelerometer input from the towing vehicle. Based on the additional inputs, the electrical converter 20 may calculate the appropriate braking signal to send to the towed vehicle. The signal may be sent to the towing vehicle via discrete wire signals or over a communications bus. Such braking control is further described in U.S. patent application Ser. No. 11/247,690 filed on Oct. 11, 2005 and U.S. patent application Ser. No. 11/247,010 filed on Oct. 11, 2005, each of which is incorporated by reference in its entirety.

Although the embodiments of the present invention have been illustrated in the accompanying drawings and described in the foregoing detailed description, it is to be understood that the present invention is not to be limited to just the embodiments disclosed, but that the invention described herein is capable of numerous rearrangements, modifications and substitutions without departing from the scope of the claims hereafter. The claims as follows are intended to include all modifications and alterations insofar as they come within the scope of the claims or the equivalent thereof.

Having thus described the invention, the following is claimed:

1. An electrical converter assembly comprising:
   a sensor assembly configured to be operably coupled to a wire of a towing vehicle and comprising:
      a housing comprising a body and a cap pivotally attached with the body;
      a wire holding portion positioned within the body of the housing;
      a core positioned in the housing;
      a current sensing device positioned in the housing in proximity to the core, the current sensing device in an operative position relative to the wire of the towing vehicle, the wire carrying a signal to a lamp of the towing vehicle, wherein the current sensing device detects electric current flow in the wire from the towing vehicle and generates an input signal proportional to and in response to detection of the electric current flow based on sensing of a magnetic field produced by the core;
   an output member operatively coupled with the sensor assembly, the output member comprising a plurality of wires; and
   an electronic component in communication with the current sensing device-to receive the input signal from the current sensing device via the corresponding plurality of wires of the output member, the electronic component generating an output signal in response to the input signal from the current sensing assembly; and
   an output device coupled to a connector being configured to connect to a lighting system of the towed vehicle to activate one or more signals of the lighting system of the towed vehicle based on the corresponding output signal received from the electronic component.

2. The electrical converter assembly of claim 1, wherein the sensor assembly is applied to a single wire of a multi-wire system of the towing vehicle.

3. The electrical converter assembly of claim 1, wherein the current sensing device detects lamp current of at least one of the left turn, right turn, stoplight, tail, backup, and auxiliary channels on the towing vehicle.

4. The electrical converter assembly of claim 3, wherein the electrical converter assembly sends the output signal through the lighting system of the towed vehicle to operate at least one of left turn, right turn, stoplight, tail lamps, backup signal or an auxiliary signal of the towed vehicle.

5. The electrical converter assembly of claim 4, wherein the sensor assembly is applied to only the stoplight signal of the towing vehicle.

6. The electrical converter assembly of claim 1, wherein the core is formed from ferrite/iron and the current sensing device is positioned within a slot of the core.

7. The electrical converter assembly of claim 1, wherein the electrical converter assembly receives power from the towing vehicle.

8. The electrical converter assembly of claim 7, wherein the power is received directly from a battery of the towing vehicle.

9. The electrical converter assembly of claim 1, wherein the input signal is a pulse width modulated signal.

10. The electrical converter assembly of claim 1, wherein the output signal is a pulse width modulated signal.

11. The electrical converter assembly of claim 1, wherein the electric current flow comprises a pulse width modulated current.

12. The electrical converter of claim 1, wherein the core comprises first, second and third ferrite core portions that circumscribe the wire of the towing vehicle when the wire of the towing vehicle is positioned within the wire holding portion.

13. The electrical converter of claim 1, wherein the sensor assembly further comprises a locking device preventing the cap from pivoting away from the body.

14. An electrical converter assembly comprising:
   a plurality of sensor assemblies, each of the plurality of sensor assemblies configured to be operably coupled to a wire of the towing vehicle and comprising:
      a housing comprising a body and a cap pivotally attached with the body;
      a wire holding portion positioned within the body of the housing;
      a core positioned in the housing;
      a current sensing device capable of non-invasively engaging the wire of the towing vehicle, the current sensing device detects current flow in the wire to determine the presence or absence of electric current in the wire from the towing vehicle and generates an input signal proportional to and in response to the detection of the electric current on the wire based on sensing of a corresponding magnetic field produced by the core;
   a plurality of output members operatively coupled with each of the plurality of the sensor assemblies, the output members comprising a plurality of wires; and
   an electrical component in operable communication with the plurality of sensor assemblies to receive the input signals from the plurality of sensor assemblies via the corresponding plurality of wires of the output members, each of the input signals having a different current load calibrated in a range, the electrical component generating an output signal that triggers a response in a lighting system of the towed vehicle in response to one or more input signals of the plurality of sensor assemblies; and
   an output device coupled to a connector capable of being connected to the lighting system of the towed vehicle to activate one or more signals of the lighting system of the towed vehicle based on the corresponding output signal received from the electronic component.

15. The electrical converter assembly of claim 14, wherein the output signal is sent to the left turn, right turn, stoplight, tail lamps, backup signal or an auxiliary signal of the towed vehicle.

16. The electrical converter assembly of claim 14, wherein the wire of the towing vehicle is a left turn, right turn, stoplight, tail, backup, or auxiliary channels wire of the towing vehicle.

17. The electrical converter assembly of claim 14, wherein the output signal is sent to the towed vehicle through a communications bus of the towed vehicle.

18. The electrical converter assembly of claim 17, wherein the output signal uses a CAN, LIN or HSCAN communications protocol.

19. The electrical converter assembly of claim 14, wherein the wire of the towing vehicle is not associated with the towed vehicle.

20. The electrical converter of claim 14, wherein the core comprises first, second and third ferrite core portions that circumscribe the wire of the towing vehicle when the wire of the towing vehicle is positioned within the wire holding portion.

21. The electrical converter of claim 14, wherein each of plurality of sensor assemblies further comprises a locking device preventing the cap from pivoting away from the body.

22. The electrical converter assembly of claim 14, wherein the range of each of the input signals is different.

23. The electrical converter assembly of claim 14, wherein at least one of the plurality of sensor assemblies is capable of employing periodic wake-up to sample current flow in the corresponding wire from the towing vehicle.

24. The electrical converter of claim 14, wherein the plurality of sensor assemblies comprises four sensor assemblies.

* * * * *